US00RE34677E

United States Patent [19]

Ray et al.

[11] E Patent Number: Re. 34,677

[45] Reissued Date of Patent: Jul. 26, 1994

[54] AUTOMATIC EMERGENCY LOCATOR SYSTEM AND METHOD

[76] Inventors: Donald K. Ray, 609 4th Ave., East Conway, S.C. 29526; Larry G. Taylor, 27 Peachtree Rd., Myrtle Beach, S.C. 29577

[21] Appl. No.: 591,230

[22] Filed: Oct. 1, 1990

Related U.S. Patent Documents

Reissue of:

[64] Patent No.: 4,878,236
Issued: Oct. 31, 1989
Appl. No.: 278,731
Filed: Dec. 2, 1988

[51] Int. Cl.[5] ..... H04M 11/04

[52] U.S. Cl. ..... 379/37; 379/386; 379/396; 340/332

[58] Field of Search ..... 379/36-38, 379/40, 45, 49, 51, 104, 105, 188, 199, 200, 354, 386, 396; 340/331, 332

[56] References Cited

U.S. PATENT DOCUMENTS

| | | | |
|---|---|---|---|
| 3,798,325 | 3/1974 | Delisle | 379/40 |
| 3,860,762 | 1/1975 | Klaiber et al. | 379/200 |
| 4,003,040 | 1/1977 | Browand | 340/332 |
| 4,425,480 | 1/1984 | Lischin | 379/200 |
| 4,442,319 | 4/1984 | Treidl | 379/105 |
| 4,491,690 | 1/1985 | Daley | 379/105 |
| 4,521,645 | 6/1985 | Carroll | 379/42 |
| 4,547,761 | 10/1985 | Jones | 340/331 |
| 4,596,900 | 6/1986 | Jackson | 379/105 |
| 4,791,667 | 12/1988 | Havel | 379/200 |

FOREIGN PATENT DOCUMENTS

| | | | |
|---|---|---|---|
| 2086187 | 5/1982 | United Kingdom | 379/188 |
| 2125597 | 3/1984 | United Kingdom | 379/37 |

OTHER PUBLICATIONS

Hasten Systems, Greensboro, N.C. "The Hasten 500-911", Owner's Manual, ©1987.

*Primary Examiner*—Wing F. Chan
*Attorney, Agent, or Firm*—Rogers & Killeen

[57] ABSTRACT

An automatic emergency locator system detects tone dialing of an emergency number, such as 911. Upon detecting this number the system turns on a visual signalling device, such as a flashing strobe light. The signalling device helps personnel responding to the emergency call locate the emergency. The visual signalling device remains on for a set period. Authorized persons can reset the system and turn off the signalling device by dialing a predetermined reset number.

10 Claims, 3 Drawing Sheets

AUTOMATIC EMERGENCY LOCATOR SYSTEM AND METHOD

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an automatic emergency locator system associated with a conventional telephone line such that, when an outgoing call is made to 911 or another designated emergency number, an external light or other signaling device is automatically actuated. This enables a person or vehicle responding to the call to visually identify the location upon reaching the vicinity of the premises.

Many real-life situations require paramedics, police, or other emergency rescue services to be dispatched to remote locations. Such remote locations may include isolated farmhouses, mountain cabins, and suburban locations in which a house may be set back far from the road. Emergencies arise for many reasons, including those which are health-related, and may involve serious injury from accidents, gunshot wounds, and the like, or from heart attacks. It is extremely important in many instances that professional help be obtained immediately. Where, for example, an individual has suffered a heart attack in which circulation of blood is denied to the brain, irreparable brain injury will occur within about four minutes. Even if the individual remains alive, his mental capacity may be irreparably damaged if circulation is not quickly restored. Consequently, it is of utmost importance that emergency personnel be able to successfully locate the correct site without delay.

In all too many instances, emergency personnel have found the general vicinity, but have been unsuccessful in locating the specific site, with the resultant delays being catastrophic with respect to the individual seeking emergency assistance. This problem is particularly acute in rural areas where the roads are not well marked and the homes have no house or lot identifying numbers.

2. The Prior Art

At the present time, emergency personnel are normally summoned by an individual seeking help through the telephone system, and most conveniently by utilizing the 911 or enhanced E911 emergency call distribution system. Both the 911 and enhanced E911 emergency call distribution systems are now nationally approved. Thus, a person anywhere in the country who has been injured or who has suffered a heart attack or other emergency has only to pick up the telephone and dial 911 in order to summon help.

Normally, if at night and if circumstances permit, a person calling 911 number will turn on an outdoor light to assist the emergency personnel in finding the location. In the excitement and confusion of the emergency, however, the person may forget to turn on the outdoor light. Alternatively, it may be impossible for the person seeking help to move around to turn on a light, as he or she may be physically incapacitated. As a consequence, effective assistance is often denied.

Distress lights and signalling systems are known in the art. One such system is described in the Jones U.S. Pat. No. 4,547,761 dated Oct. 15, 1985. Such systems generally comprise a light remotely positioned adjacent the roadside and switching means which includes a radio or ultrasound frequency transmitter inside the house designed to send a signal to a receiver mounted on the light. Such systems are not responsive to the use of the telephone and thus require the remembrance of, and physical ability to perform, an additional act.

Other systems, not directed to emergency location, use telephone lines as the communication medium. One such system is described in the Daley U.S. Pat. No. 4,491,690, and relates to a remote control system connected to telephone lines to transmit dial coded command signals to a central control unit, where the signals are converted into actuating signals for specified devices elsewhere on the premises. The actuating signals are transmitted as pulse modulated carrier waves through utility power lines serving the premises, and specifically tuned receivers on the lines associated with the devices detect the appropriate actuating signals and cause the devices to be actuated.

Still another such non-emergency system, described in the Treidl U.S. Pat. No. 4,442,319, relates to a control system for switching on or off appliances or other electrical devices at predetermined or preselected times. The timing or sequencing of switching on or off any of the appliances can be set or changed by telephoning the system from a remote telephone and providing appropriate encoded instructions through the telephone lines.

Still yet another non-emergency system, described in the Jackson U.S. Pat. No. 4,596,900, relates to a phone-line-linked, tone, operated control apparatus which comprises a detecting circuit coupled to a telephone line. An additional control circuit is used to turn on and off various devices, to make adjustments in their operation, check their status, and the like.

While these latter systems utilize telephone actuated control means, in each instance a rather complex system is described which requires the user not only to dial a complete telephone number, but then to dial individual codes to actuate the various devices.

No known systems uses the 911 emergency call distribution system to automatically actuate a remote locating device upon use of the telephone to report an emergency.

It is accordingly an object of the present invention to obviate the deficiencies of the known prior art and to provide a novel system and method for automatically actuating a remote locating device upon use of the telephone to report an emergency.

It is another object of this invention to provide an automatic emergency locator system which has an automatic reset in the event wrong numbers are dailed, and which can be reset at the premises when emergency personnel arrive.

It is a further object of the present invention to provide an emergency locating system which does not require remembrance to perform any acts additional to the call for assistance, or the physical ability to move about.

These and many other objects, features, and advantages of the invention will become more apparent to those skilled in the art upon consideration of the accompanying claims when read in conjunction with the specification and the drawings.

THE DRAWINGS

DETAILED DESCRIPTION OF THE PREFERRED EMBODIMENT

Figure 1:
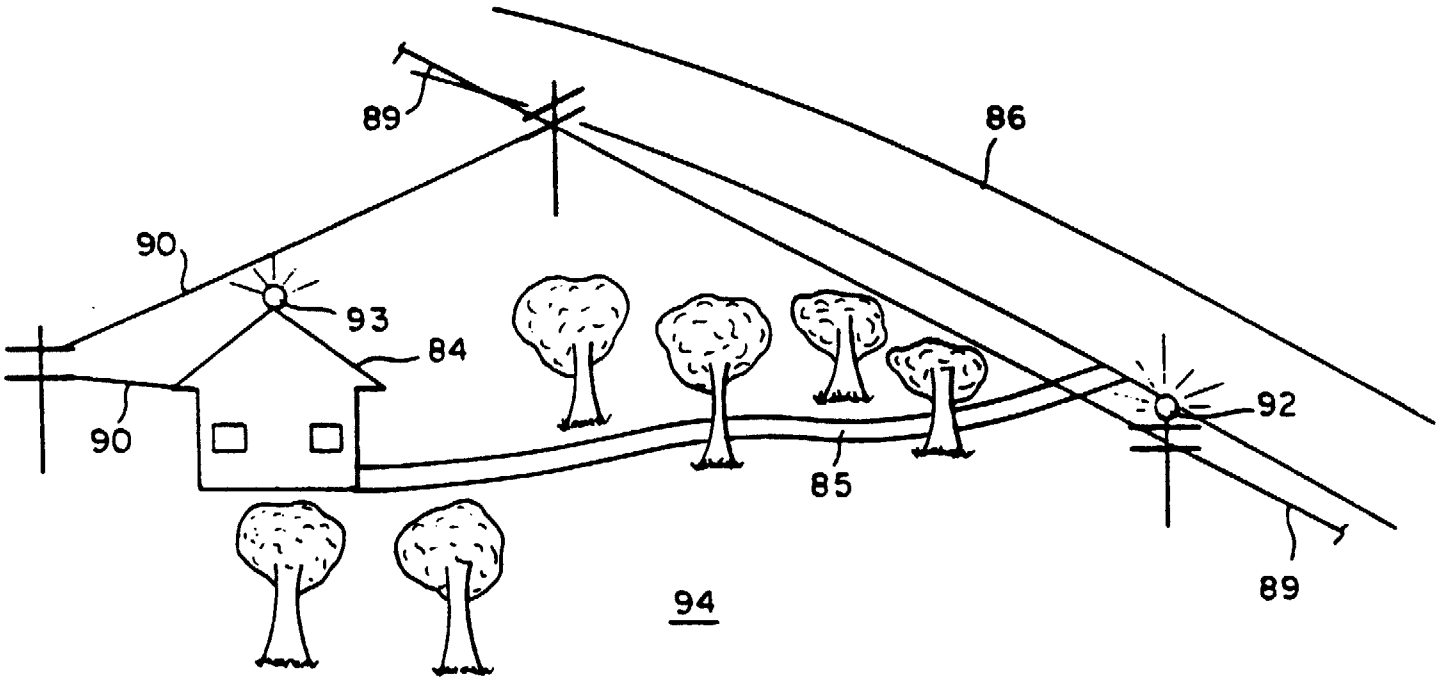
FIG. 1 is a pictorial illustration of the operation of the system of the present invention.

With reference to FIG. 1, a house 84 is situated at the end of a lane 85 leading from a road 86. A telephone pole 88 carrying a conventional telephone cable 90 from the telephone lines 89 into the house 84 may be located behind the house 84. A cabinet 92 for the electronic apparatus and indicator described herein may be attached to the telephone line at the telephone pole nearest to the entrance to the lane 85. Alternatively, the cabinet 92 may be located on any suitable conventional support at the entrance to the lane 85 and a connecting wire run to the nearest pole for connection thereat to the telephone line.

As a further alternative, the electronic apparatus may be located at the house 84 and a connecting wire run to a remote indicator 93 on the roof of the house 84 or some other convenient location.

In accordance with one aspect of the present invention, an automatic emergency locator system is automatically responsive to the use of a conventional household telephone. In a preferred embodiment, the system utilizes the dialing tones of an emergency number to actuate a switch for a signal light or other remote signaling means.

When a caller dials the 911 number for help, an electronic circuit detects the request and automatically triggers a visual device that pinpoints the exact location of the emergency. The visual device remains on for a prescribed period of time sufficient to serve the emergency. It can then be reset and turned off by appropriately authorized persons on the scene.

The preferred visual device of the system of the invention is a white flashing strobe light, but it may be any color specified by local or regional authority.

The 911 number detect device is electrically attached to a telephone cable pair and detects the appropriate three-digit code when, and only when, it is dialed on the telephone or automatic dialer. If a different three-digit code should be dialed in error, the code detect device will automatically reset, and will be ready to interrogate the code again. Thus, the circuit will always trigger the strobe or whatever signaling device is being used when the caller redials the correct three numbers.

The automatic emergency locator system is most preferably adapted to respond to a 911 telephone call, but can also be constructed so that codes other than the 911 codes will trigger the visual or other type of locator device.

Figure 2:
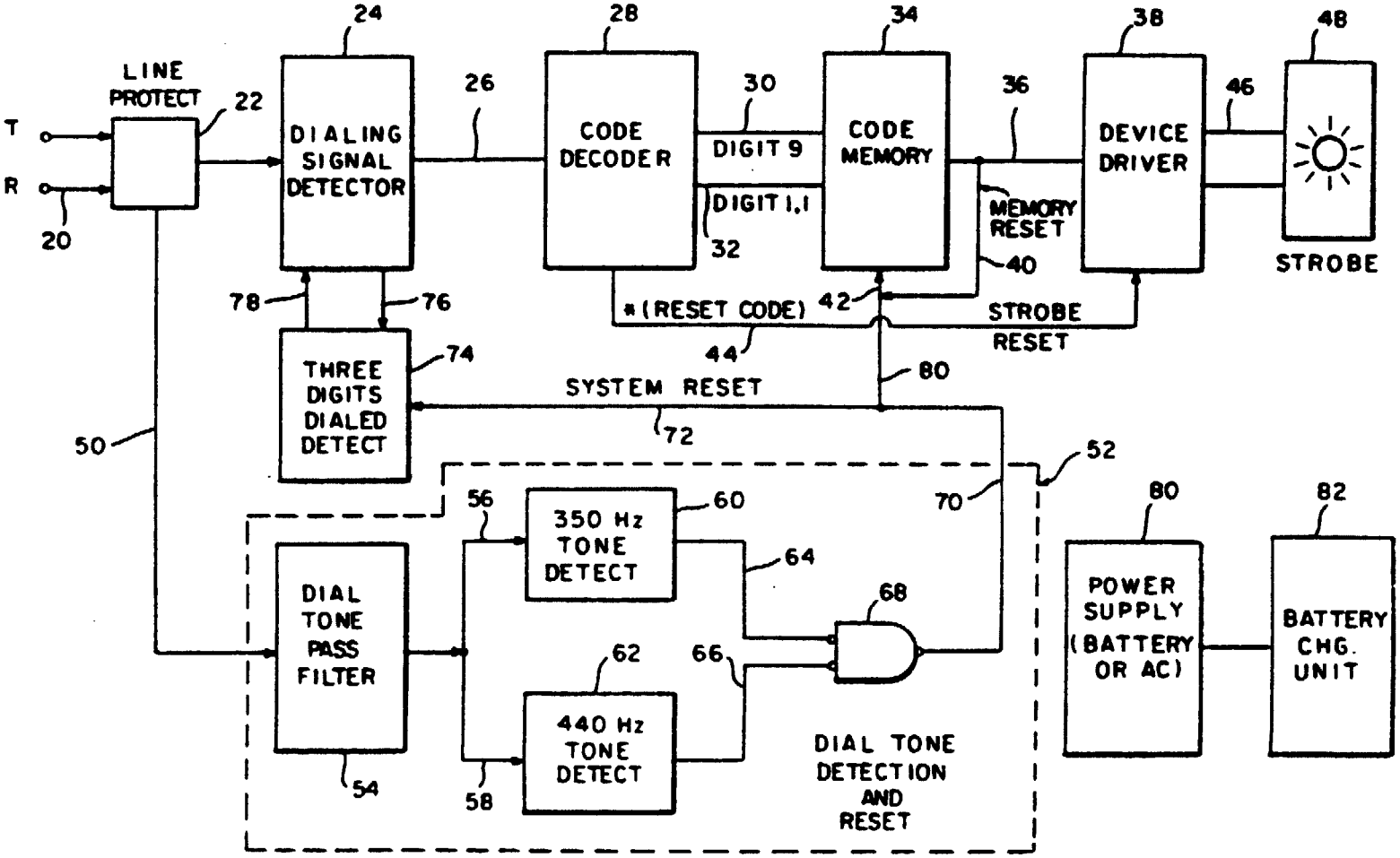
FIG. 2 is a functional block diagram of one embodiment of the automatic emergency locator system of the present invention.

Referring to FIG. 2, a telephone cable pair 20 of a conventional telephone system is operably connected in any suitable conventional manner to a line protection circuit 22.

The line protection circuit 22 provides isolation, assuring a balanced connection, and passes only AC signals to a detector circuit 24. No DC current is obtained from the telephone cable pair 20. The line protection circuit 22 additionally provides protection for the circuits of the system of the present invention from "signals" on the telephone line, e.g., ringing current and surges from lightning or the like.

The output signal from the line protection circuit 22 is applied to a dialing signal detector circuit 24 capable of detecting the dialed digits, tones, or pulses of a conventional telephone system.

The signal from the detector circuit 24 is connected by data lines 26 to a code decoder circuit 28. The code decoder circuit 28 may be designed to detect only the presence of the digits of an emergency code such as 911 to actuate the indicator.

Output leads 30 and 32 from the code decoder circuit 28 carrying the signals for the digits 9 and 1 are connected to a code memory circuit 34. The code memory circuit 34 is designed to recognize and retain the specific 911 sequence which has been dialed by the person seeking help.

The code decoder 28 also provides a reset code signal used by authorized personnel to deactivate the visual indicator as described below.

Output signals from the code memory circuit 34 are applied through a lead 36 to a timed device driver circuit 38. The code memory circuit 34 applies through lines 40 and 42 back to itself if the digits 9-1-1 are sequentially dialed. The code memory circuit 34 also receives a reset pulse through line 42 through the dial tone detect and reset circuit described below each time the phone goes "off-hook". Thus, the detection system is always reset without the need of any action by the telephone user.

The timed device driver circuit 38 receives the reset pulse from the code decoder circuit 28 through lead 44 when a specific reset pulse has been dialed by emergency personnel at the premises. The timed device driver circuit 38 provides an output pulse to close a circuit 46 to a strobe light 48 and is timed to ensure that the light 48 or other visual device remains on sufficiently long to be seen when the emergency personnel arrive. The timed device driver circuit 38 automatically resets when the established time ends, or when it receives a signal from the code decoder 28 through the lead 44.

A signal from the line protection circuit 22 is also applied through lead 50 to a dial tone detection and reset circuit 52. This circuit 52 comprises a band pass filter 54 connected to the line protection circuit 22. The output signal from the band pass filter 54 is applied through lead 56 to a 350 hertz tone detect circuit 60 and through lead 58 to a 440 hertz tone detect circuit 62. The dial tone detection and reset circuit 52 is thus responsive only to the two frequencies that make up the "Dial Tone". When the Dial Tone is sensed, the frequency detect circuits 60 and 62 provide signals through leads 64 and 66, respectively, to a logic gate 68. The logic gate 68 causes a reset pulse to be sent through lines 70 and 72 to a three-digit dial detect circuit 74, which receives and applies signals to the detector circuit 24 through lines 76 and 78.

The three-digit dial detect circuit [98] *74* detects the arrival of the first three digits dialed, and provides a shutdown pulse to the detector circuit 24 so that the dialing of the digits 9-1-1 in locations in a telephone number other than the first three digits cannot be recognized as the emergency number.

The output signal from the logic gate 68 is also applied through lines 70, 80, and 42 to the code memory circuit 34. This signal acts as a reset pulse for the code memory circuit 34 each time the telephone goes off-hook and a Dial Tone is generated in the telephone system.

Conventional methods may be utilized to provide a source of direct current to this system. As shown in FIG. 2, the power supply can include a battery 80 or a rectified source of AC current and/or a conventional battery charge unit 82. Alternatively, the cabinet 92 of FIG. 1 may be provided with a conventional solar panel.

The operation of the system of this invention may be summarized as follows:

When the person desiring to report an emergency lifts the receiver, a Dial Tone is generated in the telephone system. This Dial Tone is detected by the circuit 52 to initialize the system, i.e., to reset the three digits dialed detector 74 and the code memory circuit 34.

Thereafter, the dialed telephone digits from the telephone cable pair 20 are passed through the line protection circuit 22 and picked up by the dial tone detector circuit 24. These dialing signals are decoded in the dial tone detector and the code decoder circuit 28, which recognizes when the numbers 9-1-1 are dialed and activates the code memory circuit 34. The code memory circuit 34 then activates the device driver 38 for the strobe light 48.

At the same time, the detected dialing signals on the line are passed to the three-digit dial detect circuit 74. At the conclusion of the third digit, the detector 24 is disabled until the three-digit dial detect circuit 74 is again enabled by a new Dial Tone.

When the rescue personnel arrive at the scene, one of them may pick up the receiver and dial a new number, one or more digits, which may be recognized by the code decoder 28 to reset the device driver circuit 38, and turn off the strobe light 48.

Figure 3:
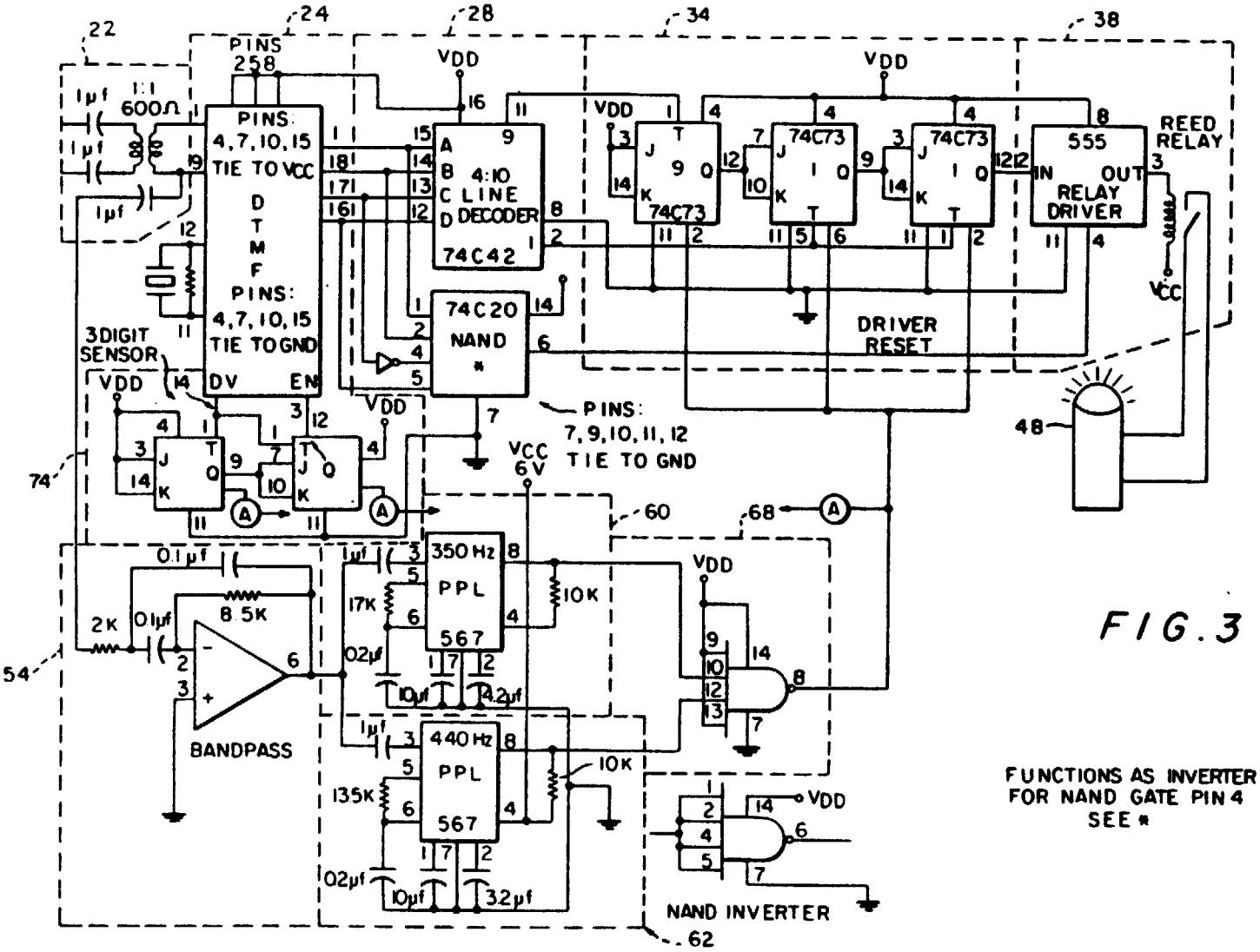
FIG. 3 is a schematic circuit diagram illustrating one embodiment of the electrical circuitry of the automatic emergency locator system of FIG. 1.

In FIG. 3, there is shown an exemplary circuit diagram for the various components of the system of this invention as described in connection with FIG. 2.

As explained above, the Dial Tone from the telephone lines is passed through a filter 54 and the two tones thereof detected in the circuits 60, 62. When both are present, the gate 68 initializes the system by resetting the code memory circuit 34 and the three-digit dial detector 74.

Also, as explained above, the dialing signal detector 24 detects the dialing signals on the telephone lines, which dialing signals are decoded in the decoder 28. If the first digit detected is a "9", the first JK flip-flop of the memory circuit enables the second JK flip-flop. If the second JK flip-flop receives the signal indicating that the next digit was a "1", then the third JK flip-flop is enabled. If it receives a signal indicating that the third digit is a "1", then the relay driver 38 is enabled to activate the indicator 48.

The three-digit detector 74 enables the detector 24 when reset by the Dial Tone. Upon detection of the third digit by the detector 74, the three-digit detector 74 is activated to disable the detector 24.

Although this invention is described in terms of a system for use in conjunction with a 911 emergency call system, it should be recognized by those skilled in the art that the invention may be adapted to respond to any number of selected digits. Thus, if at some future time the emergency call numbers are, for example, 999, the system of the invention can be adapted for use therewith.

The specific embodiment described and illustrated herein is susceptible of modification in form and detail without departing from the spirit of the invention. Accordingly, the invention is not to be limited to the illustrative embodiment disclosed, but encompasses all modifications coming within the scope of the following claims when accorded a full range of equivalents.

We claim:

1. An automatic emergency locator system comprising:

(a) dialing signal detecting means adapted to be physically located adjacent to and operably connected to a telephone line for automatically detecting the dialing of either a predetermined emergency telephone number or a predetermined reset number;

(b) protector circuit means for protecting said detecting means from signals on the telephone line;

(c) *decoder* means for detecting the number of digits dialed and for disabling said dialing signal detector means upon the detection of the dialing of a predetermined number of digits after detection of a Dial Tone;

(d) Dial Tone detection means for initializing said dialing signal detecting means and said digit detecting means;

(e) storage means operably connected to said detecting means for storing the detected emergency number;

(f) indicator means adapted to be physically located remote from the telephone in position to be readily viewed by personnel responding to the dialing of said emergency number, said indicator means being operably connected to said storage means for activation thereby upon detection of said emergency number and to said decoder means for deactivation thereby upon detection of said reset number;

whereby the dialing at the telephone of an emergency number within a premises is automatically detected to activate said indicator means located externally of the premises without any further action by the person dialing the emergency number so that personnel responding to the dialing of the emergency number may more readily locate said indicator means and thus the premises from which the emergency number was dialed.

2. A method of aiding emergency rescue personnel to locate a premises in a remote or difficult to find location which comprises:

(a) detecting the Dial Tone signal of a telephone line;

(b) detecting the dialing of only a predetermined number of the digits of a dialed telephone number and that the digits correspond to an emergency number;

(c) activating in response to this detection a signal means physically located remote from the telephone in a location readily viewed by personnel responding to the dialing of said emergency number;

whereby the dialing at the telephone of an emergency number within a premises is automatically detected to activate signal means located externally of the premises without any further action by the person dialing the emergency number so that personnel responding to the dialing of the emergency number may more readily locate the premises from which the emergency number was dialed.

3. The method of claim 2 including the further steps of:

(e) detecting the dialing of the digits of a reset code; and (f) deactivating said signal means in response to the detection of said reset code, whereby the dialing of said reset code at the telephone by emergency personnel upon arrival at the premises will deactivate the signal means.

*4. An automatic emergency locator system comprising:*

*(a) dialing signal detecting means operably connected to a telephone line for automatically detecting the dialing of a predetermined emergency telephone number;*

*(b) decoder means operatively connected to said dialing signal detecting means for discriminating, after detection of an off-hook condition, between (i) said predetermined emergency number and (ii) the digits of said predetermined emergency telephone number when dialed as a portion of a series of digits greater in number than said predetermined emergency number;*

*(c) off-hook condition detection means for initializing said dialing signal detecting means and said decoder means;*

*(d) indicator means adapted to be physically located in position to be readily viewed by personnel external of the premises responding to the dialing of said emergency number, said indicator means being operably connected to said decoder means for activation thereby upon detection of said emergency number;*

*whereby the dialing at the telephone of said emergency number within a premises is automatically detected to activate said indicator means without any further action by the person dialing the emergency number so that personnel external of the premises responding to the dialing of said emergency number may more readily locate said indicator means and thus identify the premises from which said emergency number was dialed.*

*5. The system as defined in claim 4 wherein said off-hook condition detection means detects the off-hook condition by the detection of a Dial Tone.*

*6. The system as defined in claim 4 wherein said dialing signal detection means comprises means for detecting dual tone multifrequency dialing tones.*

*7. The system as defined in claim 4 wherein said dialing signal detection means comprises means for detecting dialing pulses.*

*8. The system as defined in claim 4 wherein said dialing signal detecting means further comprises means for detecting a predetermined reset number and wherein said indicator means is operably connected to said dialing signal detecting means for deactivation thereby upon detection of said reset number.*

*9. The system as defined in claim 4 further comprising a timer operably connected to said indicator means for deactivating said indicator means a predetermined period of time after activation by said decoder means.*

*10. The system as defined in claim 4 wherein elements (a)-(c) are colocated.*

* * * * *